United States Patent
Zhao et al.

(10) Patent No.: US 12,169,172 B2
(45) Date of Patent: *Dec. 17, 2024

(54) SYSTEMS, METHODS, AND COMPUTER PROGRAM PRODUCTS FOR INFRARED IMAGING OPERATIONS

(71) Applicant: Rebellion Photonics, Inc., Houston, TX (US)

(72) Inventors: Chuan Zhao, Sugar Land, TX (US); Quan Shen, Houston, TX (US); Reza Katebi, Decatur, GA (US); Patrick Charles O'Driscoll, Houston, TX (US)

(73) Assignee: Rebellion Photonics, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,546

(22) Filed: May 19, 2023

(65) Prior Publication Data
US 2023/0288324 A1    Sep. 14, 2023

Related U.S. Application Data

(63) Continuation of application No. 17/531,351, filed on Nov. 19, 2021, now Pat. No. 11,686,675.

(51) Int. Cl.
*G01N 21/3518* (2014.01)
*G01J 5/00* (2022.01)
*H04N 5/33* (2023.01)

(52) U.S. Cl.
CPC ........ *G01N 21/3518* (2013.01); *G01J 5/0014* (2013.01); *H04N 5/33* (2013.01); *G01J 2005/0077* (2013.01)

(58) Field of Classification Search
CPC ..... G01N 21/3518; G01J 5/0014; G01J 5/025
See application file for complete search history.

(56) References Cited

U.S. PATENT DOCUMENTS 10,458,905 B2    10/2019    Kester et al.
10,955,355 B2    3/2021    Kester et al.
(Continued)

FOREIGN PATENT DOCUMENTS

EP    3573023 B1    9/2020
FR    3035714 A1 *    11/2016    ............ G01M 3/002
(Continued)

OTHER PUBLICATIONS

Examiner Interview Summary Record (PTOL—413) Mailed on Feb. 10, 2023 for U.S. Appl. No. 17/531,351.
(Continued)

*Primary Examiner* — David P Porta
*Assistant Examiner* — Casey Bryant
(74) *Attorney, Agent, or Firm* — Alston & Bird LLP

(57) ABSTRACT

Systems, methods, and computer program products for infrared (IR) image operations are provided. An example imaging system includes a first IR imaging device configured to generate first IR image data and a second IR imaging device configured to generate second IR image data. The system further includes a computing device that receives the first IR image data from the first IR imaging device and receives the second IR image data from the second IR imaging device. The computing device further determines a first feature representing a position of a gas plume based upon the first IR image data and a second feature representing a position of the gas plume based upon the second IR image data and determines a disparity between the first and second features. The computing device further determines a distance between the imaging system and the gas plume based upon the determined disparity.

20 Claims, 6 Drawing Sheets

(56) References Cited

U.S. PATENT DOCUMENTS

2017/0089800 A1* 3/2017 Huseynov .................. G01S 5/20
2019/0078966 A1* 3/2019 Zhang ................... G01M 3/002

FOREIGN PATENT DOCUMENTS

JP          H0626972 A * 2/1994 .............. G01M 3/04
JP          6492612 B2   4/2019

OTHER PUBLICATIONS

Notice of Allowance and Fees Due (PTOL-85) Mailed on Feb. 10, 2023 for U.S. Appl. No. 17/531,351.

* cited by examiner

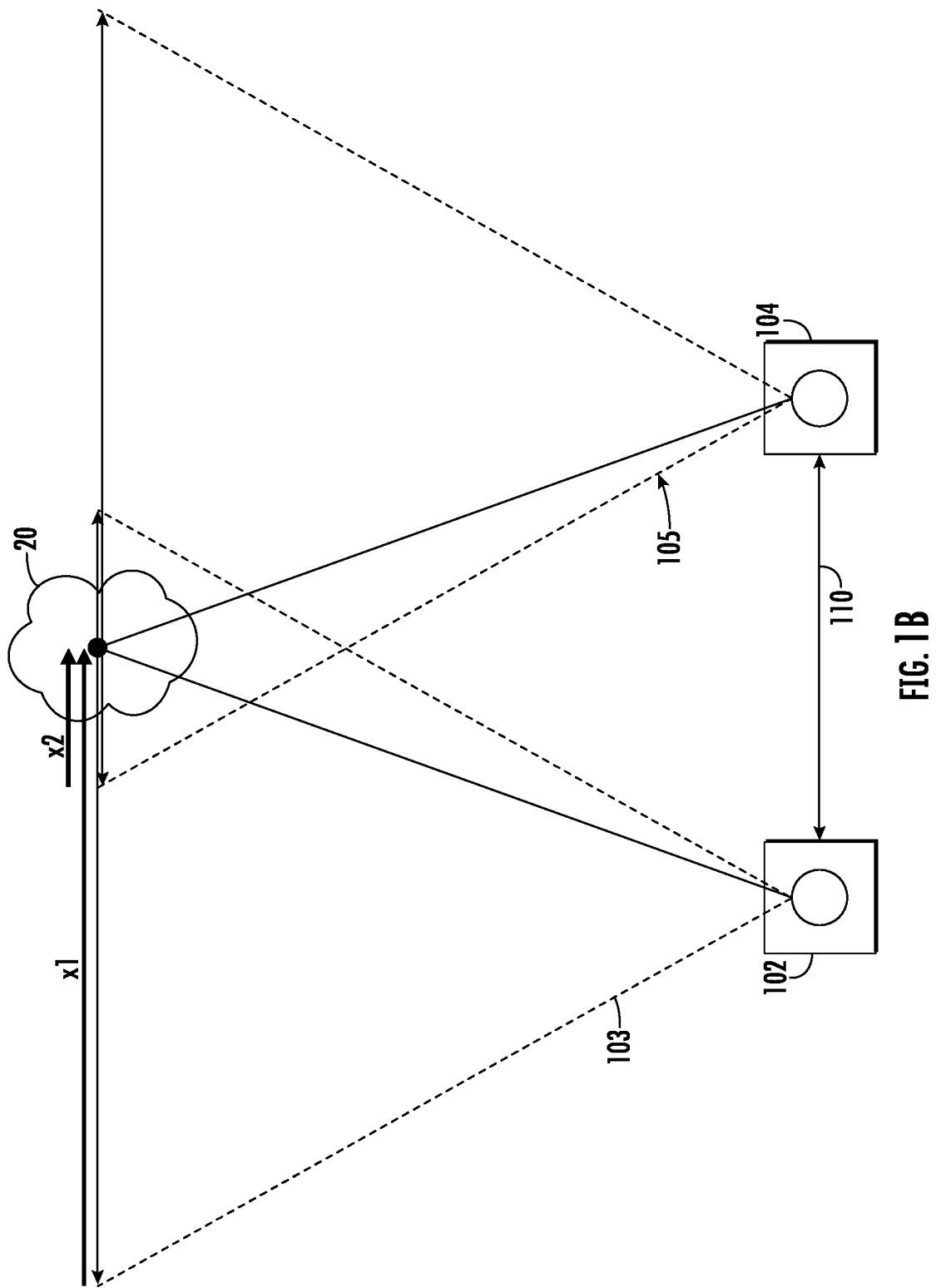

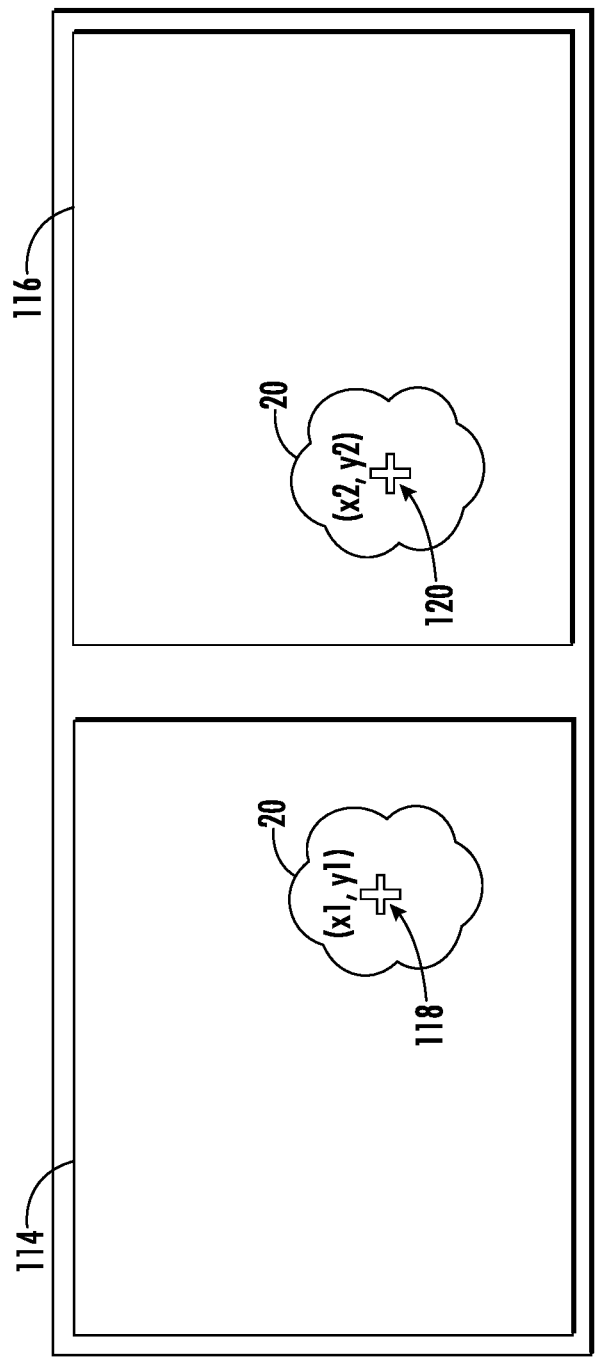

ns, MethODS, AND COMPUTER
SYSTEMS, METHODS, AND COMPUTER PROGRAM PRODUCTS FOR INFRARED IMAGING OPERATIONS

CROSS-REFERENCE TO RELATED APPLICATIONS

This patent application is a continuation of U.S. patent application Ser. No. 17/531,351, filed Nov. 19, 2021, which is incorporated herein by reference in its entirety.

TECHNOLOGICAL FIELD

Example embodiments of the present disclosure relate generally to imaging systems and, more particularly, to infrared (IR) imaging to detect and quantify gas leakages.

BACKGROUND

In many environments, such as manufacturing facilities, drilling locations, pipelines, and/or the like, gases may be used, stored, transferred, moved, etc. For example, a natural gas pipeline may transport natural gas (e.g., methane and/or the like) between locations. During transport, some gas may be emitted from such an example pipeline, such as due to a leak in the pipeline system (e.g., due to poor sealing at pipe junctions, an impact with the pipeline, etc.). In order to identify a leak and/or quantify the amount of gas emitted from the leak, hyperspectral cameras may be used. The inventors have identified numerous deficiencies with the existing technologies in this field, the remedies for which are the subject of the embodiments described herein.

BRIEF SUMMARY

As described above, many industries and environments rely upon or otherwise leverage gases in performing various operations associated with these industries. For example, the natural gas industry may extract, transport, and process natural gas (e.g., methane and/or the like) for subsequent use in generating heat, generating electricity, fueling vehicles, etc. The emittance of this gas to an external environment, such as due to a leak in one or more systems, may result in large costs in lost product as well as the potential for large fines from, for example, governmental regulatory agencies. Furthermore, the leakage of gases such as methane may present a dangerous condition to workers or otherwise impact workplace safety. As such, the accurate detection and quantification of gas leakages (e.g., a leaking plume of gas) is of critical importance in order to maximize profit while preventing hazardous conditions.

A key measurement or parameter in detecting or quantifying gas plumes, via image processing or the like, is the distance between the detection device (e.g., a hyperspectral camera or the like) and the leaking plume of gas. Traditional systems that attempt to determine this distance, however, are often rigid in that they are based upon an initial set up calibration procedure. For example, a hyperspectral camera may be placed at a particular location and positioned so as to capture images of particular areas at which gas may leak. A laser telemeter or rangefinder may be used to determine the distance between the hyperspectral camera and these areas of concern. In operation, however, the hyperspectral camera may be moved, the field of view (FOV) associated with one or more imaging devices of the camera may pivot, rotate, etc., and/or the gas leak may occur at any number of positions within the FOV of the camera, each of which may be associated with a different distance to the camera. As such, these conventional systems fail to provide dynamic calibrations and/or modification to gas leakage detection implementations by relying upon rigid calibration procedures that fail to account for the dynamic nature of real-world applications.

To solve these issues and others, example implementations of embodiments of the present disclosure may leverage a plurality of IR imaging devices configured to capture IR image data of respective FOVs. A computing device operably connected with these IR imaging devices may receive the respective IR image data and leverage a template matching procedure to determine respective features (e.g., central positions, edges, contours, corners, etc.) of a gas plume with the respective IR image data. A disparity between these features of the gas plume may be determined and, based upon this disparity, a distance between the imaging system and the gas plume may be determined, such as via epipolar geometry. In this way, the imaging system of the present disclosure may iteratively determine a distance between the imaging system and a detected gas plume so as to account for the varying environmental influences that impact operation of the imaging system. In doing so, the embodiments of the present disclosure may operate to improve gas leak detection and quantification while also providing mechanisms for modifying operation of the imaging system in response to environmental influences.

Apparatuses, methods, systems, devices, and associated computer program products are provided for IR image operations. An example imaging system may include a first IR imaging device configured to generate first IR image data of a field of view of the first IR imaging device and a second IR imaging device configured to generate second IR image data of a field of view of the second IR imaging device. The imaging system may further include a computing device operably connected with the first IR imaging device and the second IR imaging device. The computing device may be configured to receive the first IR image data from the first IR imaging device and receive the second IR image data from the second IR imaging device. The computing device may further determine, via a template matching procedure, a first feature representing a position of a gas plume based upon the first IR image data and a second feature representing a position of the gas plume based upon the second IR image data and determine a disparity between the first feature and the second feature. The computing device may also determine, via epipolar geometry, a distance between the imaging system and the gas plume based upon the determined disparity.

In some embodiments, the first IR imaging device and the second IR imaging device may be each supported by a housing such that a device spacing is defined between the first IR imaging device and the second IR imaging device.

In some further embodiments, the first IR imaging device and the second IR imaging device may be each associated with the same focal length and pixel size.

In some still further embodiments, the computing device may be configured to determine the distance between the imaging system and the gas plume based upon the determined disparity, the device spacing, the focal length, and the pixel size.

In some embodiments, the imaging system may further include a first filter attached to the first IR imaging device and a second filter attached to the second IR imaging device, wherein the first filter and the second filter each define a band-pass frequency associated with a frequency of the gas plume.

In some embodiments, the computing device, prior to determining the first feature of the gas plume and the second feature of the gas plume, may be further configured to generate template IR image data based upon the first IR image data, generate target IR image data based upon the second IR image data, and compare the similarity score with a template threshold. In an instance in which the similarity score satisfies the template threshold, the computing device may determine the first feature and the second feature. In an instance in which the similarity score fails to satisfy the template threshold, the computing device may generate an alert signal.

In some further embodiments, generating the template IR image data may include assigning a binary value to one or more data entries of the first IR image data.

In other further embodiments, generating the template IR image data may include assigning a binary value to one or more data entries of the second IR image data.

In some embodiments, the alert signal may be configured to present a notification to a user associated with the imaging system.

In other embodiments, the alert signal may be configured to set the distance between the imaging system and the gas plume as a default distance.

In some embodiments, the computing device may be configured to modify one or more operating parameters of the imaging system based upon the determined distance.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 1B illustrates another view of the example imaging system of FIG. 1 with associated field of views (FOVs) shown, in accordance with some example embodiments described herein;

FIG. 1C illustrates an example visual representation of IR image data, such as generated by the imaging system of FIG. 1, in accordance with some example embodiments described herein;

DETAILED DESCRIPTION

Figure 1A:
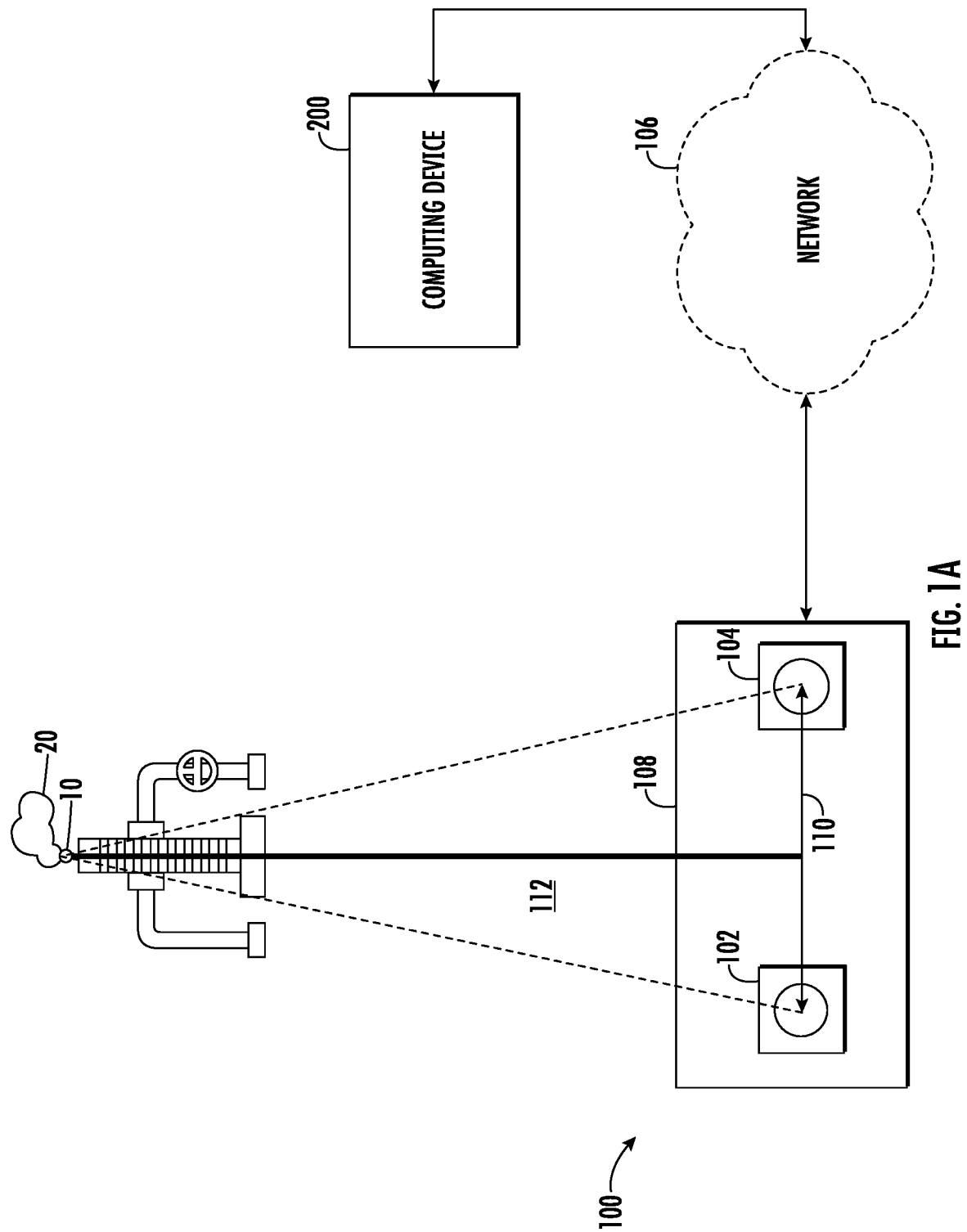
FIG. 1A illustrates an example imaging system in operation with a target gas leak in accordance with some example embodiments described herein.

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a computing device of an example imaging system as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first device is described herein to receive data from a second device, it will be appreciated that the data may be received directly from the second device or may be received indirectly via one or more intermediary computing devices, such as, for example, one or more servers, relays, routers, network access points, base stations, hosts, and/or the like, sometimes referred to herein as a "network." Similarly, where a first device is described herein as sending data to a second device, it will be appreciated that the data may be sent directly to the second device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "first IR imaging device" or "first IR imager" refer to a device or devices capable of generating first IR image data. Example first IR imaging devices may include a thermal imaging camera, an IR imager, an IR camera, a thermographic camera, and/or the like that may generate IR image data indicative of a field of view (FOV) of the first IR imaging device. Said differently, the first IR imaging device may include any device, apparatus, system, etc. capable of detecting infrared energy/radiation and converting said infrared energy/radiation into a corresponding electronic signal (e.g., first IR image data). By way of a non-limiting example, the first IR imaging device may include an IR camera configured to capture IR energy emitted by an example gas leakage source as described hereafter located within a first FOV associated with the first IR imaging device. The first IR imaging device may also be associated with a first filter that defines a first band-pass frequency (e.g., a device that passes frequencies within a certain range and attenuates frequencies outside this range). As described hereafter, this first filter may be configured to pass IR radiation having a frequency associated with the gas for which the imaging device is design to monitor (e.g., methane or the like) to the first IR imaging device.

As used herein, the terms "second IR imaging device" or "second IR imager" refer to a device or devices capable of generating second IR image data. Example second IR imaging devices may also include a thermal imaging camera, an IR imager, an IR camera, a thermographic camera, and/or the like that may generate IR image data indicative of a field of view (FOV) of the second IR imaging device. Said differently, the second IR imaging device may include any device, apparatus, system, etc. capable of detecting infrared energy/radiation and converting said infrared energy/radiation into a corresponding electronic signal (e.g., second IR image data). By way of a non-limiting example, the second IR imaging device may also include an IR camera configured to capture IR energy emitted by an example gas leakage source as described hereafter located within a second FOV associated with the second IR imaging device. The second IR imaging device may also be associated with a second filter that defines a second band-pass frequency (e.g., a device that passes frequencies within a certain range and attenuates frequencies outside this range). As described hereafter, this second filter may be configured to pass IR radiation having a frequency associated with the gas for which the imaging device is design to monitor (e.g., methane or the like) to the second IR imaging device and may further be configured for use with the same frequency as the first filter. Although described herein with refence to two (2) IR imaging devices, the present disclosure contemplates that the imaging system may include any number of IR imaging devices based upon the intended application of the imaging system.

As used herein, the term "computing device" refers to any user device, controller, object, or system which may be in physical or network communication with a first IR imaging device and the second IR imaging device as described hereafter. For example, the computing device may refer to a wireless electronic device configured to perform various IR image related operations in response to first IR image data and/or second IR image data generated by the first IR imaging device and the second IR imaging device, respectively. The computing device may be configured to communicate with the first IR imaging device and/or the second IR imaging device via Bluetooth, NFC, Wi-Fi, 3G, 4G, 5G protocols, and the like. In some instances, the computing device may comprise the first IR imaging device and/or the second IR imaging device (e.g., an integrated configuration).

As used herein, the terms "gas leak," "gas plume," and/or "gas leak plume" may refer to a collection of gas atoms or particles that include vast separation between individual atoms or particles. Such a gas may leak or otherwise be emitted from a containing vessel (e.g., natural gas pipeline or the like) and may be formed as a plume or column. This plume may be a vertical body of a first fluid (e.g., the leaking gas) moving relative or through another second fluid (e.g., the ambient air). As would be evident in light of the present disclosure, the intensity of the gas may dissipate as the distance between the leaking gas and the source of the leak increases. For example, a gas leak from a pipeline that contains methane gas may result in a gas plume of methane gas emitted from the pipeline such that the intensity (e.g., concentration) of methane gas decreases as the distance between the particles of methane gas and the location of the leakage increases. Although described herein with reference to an example methane gas application, the present disclosure contemplates that the imaging system(s) described herein may be configured for use with gas of any type, concentration, etc.

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIGS. 1A-1B, an example imaging system 100 is illustrated with a first IR imaging device 102 and a second IR imaging device 104 operably coupled with a computing device 200 via a network 106. As defined above, the first IR imaging device 102 may comprise a device capable of generating first IR image data and may be a thermal imaging camera, an IR imager, an IR camera, a thermographic camera, and/or the like. The first IR imaging device 102 may be associated with a FOV 103. The FOV 103 may refer to the observable area within which the first IR imaging device 102 may capture images (e.g., generate first IR image data). As described hereafter, in some embodiments, the first IR imaging device 102 may be positioned or oriented such that a gas leakage source 10 is physically located within the FOV 103 of the first IR imaging device 102. Said differently, the FOV 103 of the first IR imaging device 102 may be such that first IR image data generated by the first IR imaging device 102 (e.g., captured IR images of the FOV 103) may include IR image data indicative of or otherwise associated with the gas leakage source 10 (e.g., so as to capture IR image data of the gas plume 20). The present disclosure contemplates that the first IR imaging device 102 may be positioned at any physical location and at any orientation based upon the intended application of the system 100. Furthermore, the present disclosure contemplates that the FOV 103 may be varied based upon the operating parameters of the first IR imaging device 102.

As defined above, the second IR imaging device 104 may comprise a device capable of generating second IR image data and may be a thermal imaging camera, an IR imager, an IR camera, a thermographic camera, and/or the like. The second IR imaging device 104 may be associated with a FOV 105. The FOV 105 may refer to the observable area within which the second IR imaging device 104 may capture images (e.g., generate second IR image data). As described hereafter, in some embodiments, the second IR imaging device 104 may be positioned or oriented such that a gas leakage source 10 is physically located within the FOV 105 of the second IR imaging device 104. Said differently, the FOV 105 of the second IR imaging device 104 may be such that second IR image data generated by the second IR imaging device 104 (e.g., captured IR images of the FOV 105) may include IR image data indicative of or otherwise associated with the gas leakage source 10 (e.g., so as to capture IR image data of the gas plume 20). The present disclosure contemplates that the second IR imaging device 104 may be positioned at any physical location and at any orientation based upon the intended application of the system 100. Furthermore, the present disclosure contemplates that the FOV 105 may be varied based upon the operating parameters of the second IR imaging device 104. As would be evident in light of the present disclosure, the first FOV 103 and the second FOV 105 may be different based upon the different positions of the respective first IR imaging device 102 and second IR imaging device 104.

In some embodiments as described herein, the first IR imaging device 102 and the second IR imaging device 104 may be formed as an integral device or may be otherwise commonly housed, such as via housing 108 of a hyperspectral camera. In such an embodiment, the FOV 103 and the FOV 105 may, for example, at least partially overlap. In such an embodiment, the first IR imaging device 102 and the second IR imaging device 104 may be positioned by the housing 108 such that a device spacing 110 is defined between these devices 102, 104 within the housing 108. In other embodiments, the first IR imaging device 102 and the second IR imaging device 104 may be separately located. In such an embodiment, the device spacing 110 may refer to a linear distance between these separate housings (not shown). In any embodiment, the present disclosure contemplates that the FOV 103 and/or the FOV 105 may be dynamically adjusted (e.g., tilted, panned, pivoted, etc.) during performance of the operations described herein. Furthermore, the device spacing 110 may be known to or otherwise accessible by an example computing device of the present disclosure, such as to perform associated epipolar geometry determinations as described herein.

Figure 3:
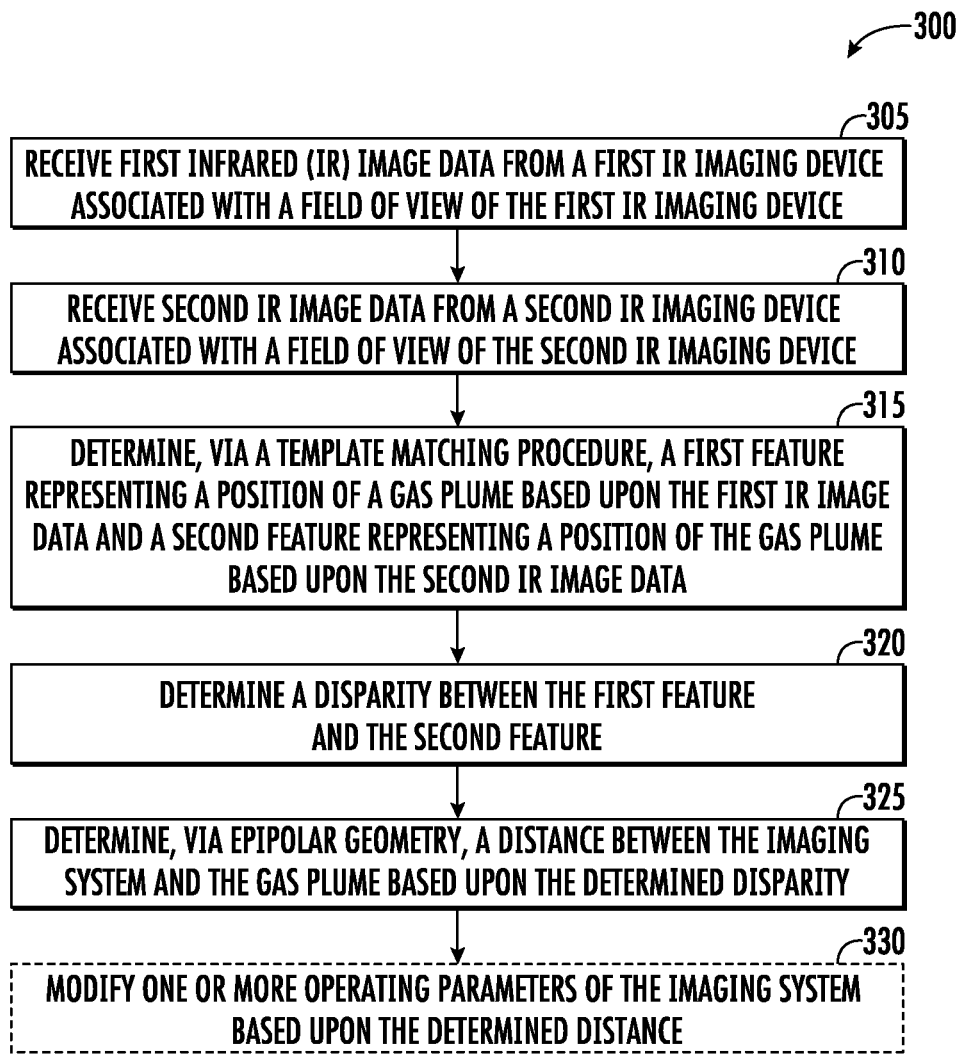
FIG. 3 illustrates an example flowchart for example distance determinations, in accordance with some example embodiments described herein.
Figure 4:
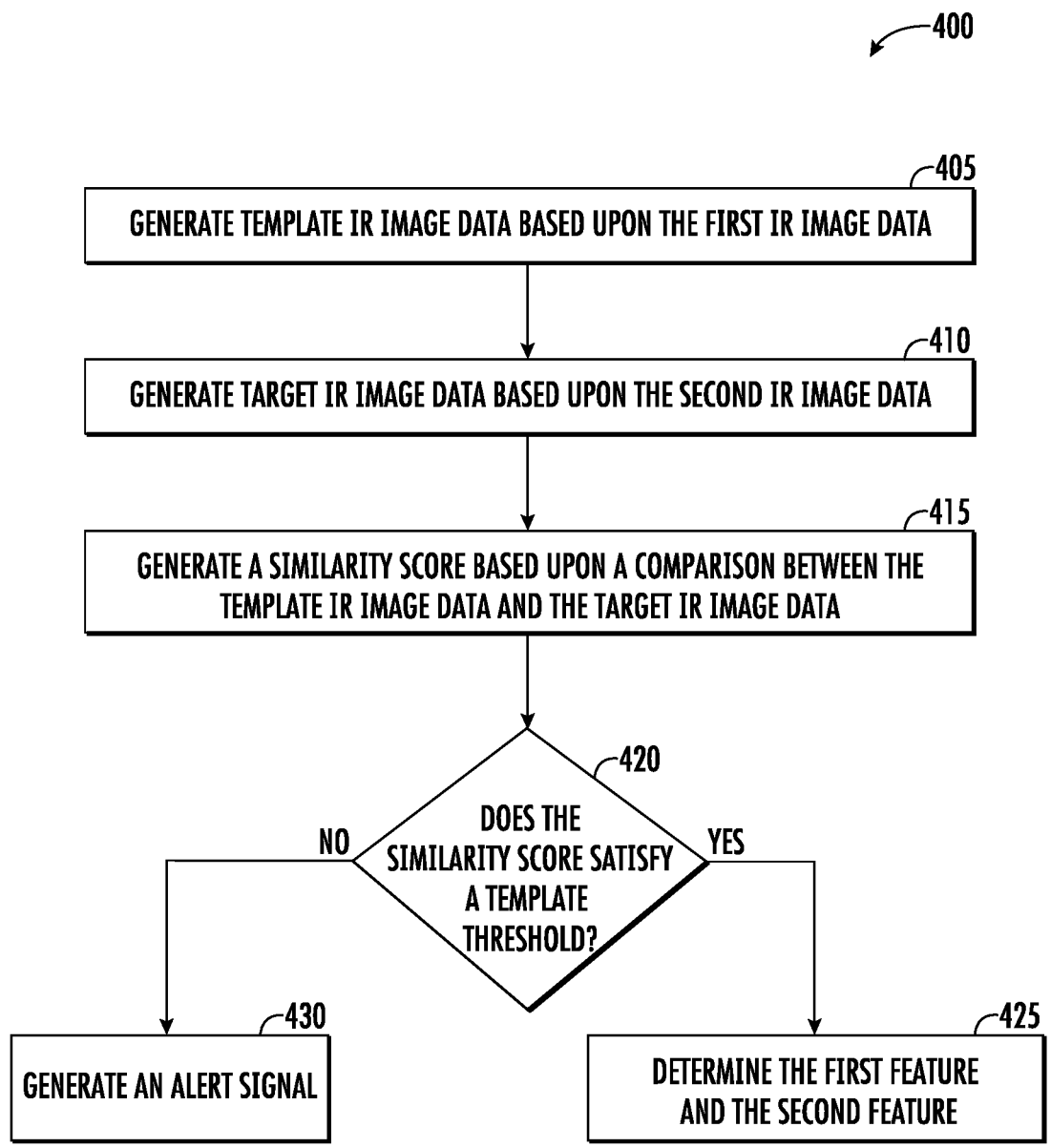
FIG. 4 illustrates an example flowchart for template threshold comparisons, in accordance with some example embodiments described herein.

As described hereafter with reference to the operations of FIGS. 3-4, the imaging system 100 of the present disclosure may be positioned proximate a gas leakage source 10 (e.g., a pipeline or any feature, vessel, container, etc. from which gas may leak) so as to detect and quantify a gas plume 20 emitted from the gas leakage source 10. The positioning may be such that a distance 112 exists between the gas leakage source 10 and, by association, the gas plume 20. As shown in FIGS. 1B-1C, however, the first IR image data generated by the first IR imaging device 102 and the second IR image data generated by the second IR imaging device 104 may differ due to the different perspectives (e.g., FOVs 103, 105) of these devices 102, 104. As shown in FIG. 1C, a visual representation of the first IR image data 114 and a visual representation of the second IR image data 116 illustrate that while the gas plume 20 is the same within each representation 114, 116, the positioning of the gas plume 20 varies as described above. As such, a first feature (e.g., geometric center, center of mass, etc.) 118 or set of features (e.g., corners, edges, contours, etc.) for the gas plume 20 in the first IR image data 114 differs from a second feature (e.g., geometric center, center of mass, etc.) 120 or set of features (e.g., corners, edges, contours, etc.) for the same gas plume 20 in the second IR image data 116. Any disparity between the first feature 118 of the gas plume 20 in the first IR image data 114 and the second feature 120 of the gas plume 20 in the second IR image data 116 may, as shown in FIG. 1B, be illustrated as a difference between x coordinates (i.e., x1 and x2). Said differently, the disparity described hereafter may, in some examples, refer to a difference between a measurement (x1) from an edge of the FOV 103 of the first IR imaging device 102 and the center of the gas plume 20 and a measurement (x2) from an edge of the FOV 105 of the second IR imaging device 104 and the center of the gas plume 20. Although illustrated with reference to central locations of the gas plume 20, first feature(s) 118 and second feature(s) 120 may refer to any location within the gas plume 20 based upon the intended application of the system 100.

With continued reference to FIGS. 1A-1B, the imaging system 100 may include a computing device 200 that is connected with the first IR imaging device 102 and the second IR imaging device 104 over a network 106. In some instances, the first IR imaging device 102 may comprise the computing device 200, in whole or in part. In some instances, the second IR imaging device 104 may comprise the computing device 200, in whole or in part. In other instances, the first IR imaging device 102, the second IR imaging device 104, and the computing device 200 may be formed as a single, integrated device. The computing device 200 may include circuitry, networked processors, or the like configured to perform some or all of the apparatus-based (e.g., IR image based) processes described herein and may be any suitable processing device and/or network server. In this regard, the computing device 200 may be embodied by any of a variety of devices. For example, the computing device 200 may be configured to receive/transmit data (e.g., IR image data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure.

The network 106 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 106 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 106 may include a public network, such as the Internet, a private network, such as an intranet, or combinations thereof, and may utilize a variety of networking protocols now available or later developed including, but not limited to TCP/IP based networking protocols. In some embodiments, the network 106 may refer to a collection of wired connections such that the first IR imaging device 102, the second IR imaging device 104, and/or the computing device 200 may be physically connected, via one or more networking cables or the like.

Figure 2:
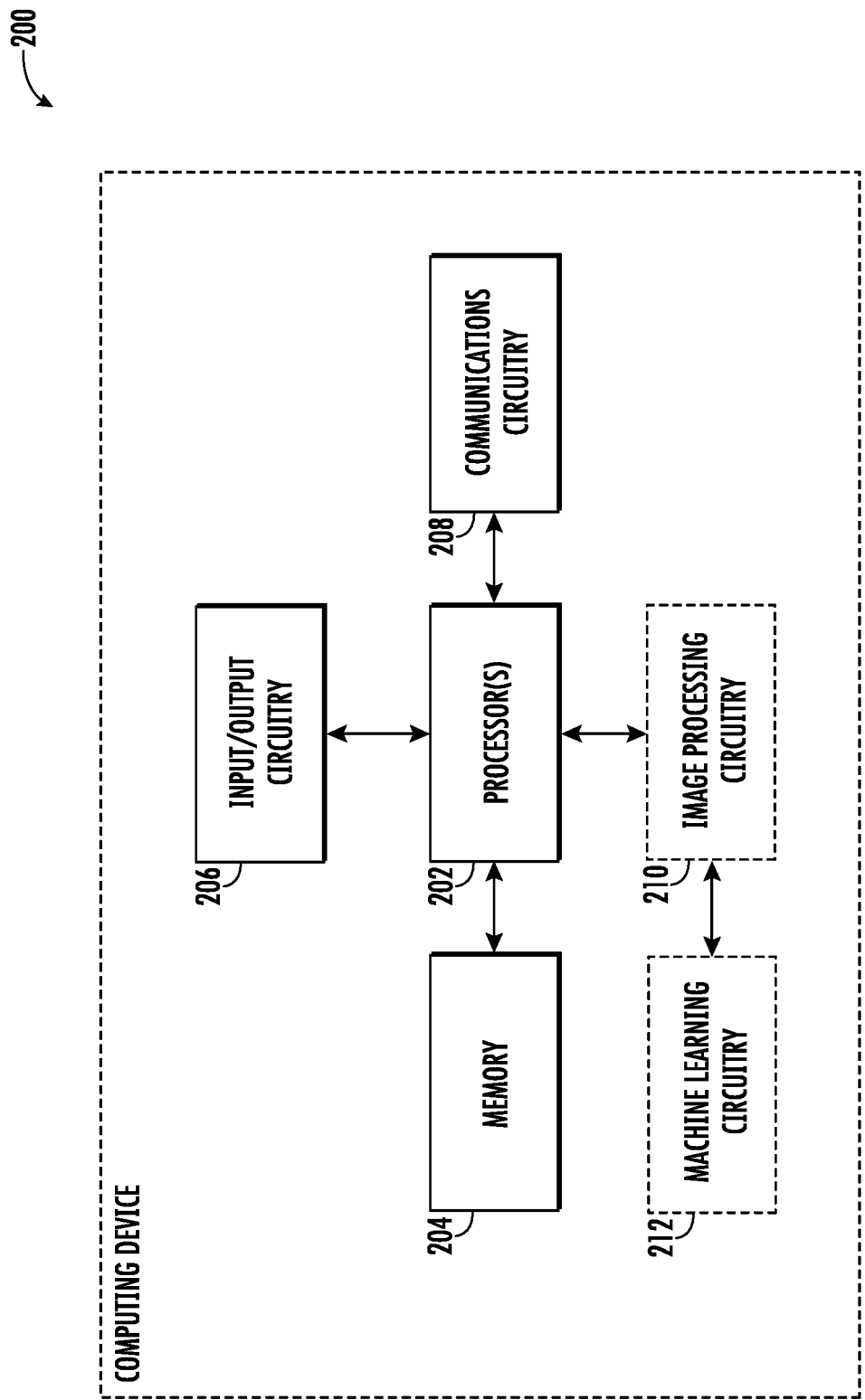
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, the computing device 200 may include image processing circuitry 210 and/or machine learning circuitry 212. The computing device 200 may be configured to execute the operations described below in connection with FIGS. 3-4. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within the first IR imaging device 102 and/or the second IR imaging device 104. It will be understood in this regard that some of the components described in connection with the computing device 200 may be housed within one or more of the devices of FIG. 1, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or coprocessor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The image processing circuitry 210 includes hardware components designed to analyze the first IR image data and/or the second IR image data so as to determine a first feature 118 of a gas plume 20 and a second feature 120 of the gas plume 20. The image processing circuitry 210 may further determine a disparity between the first feature 118 and the second feature 120 as related to determination of a distance between the imaging system 100 and the gas plume 200. Image processing circuitry 210 may utilize processing circuitry, such as the processor 202, to perform its corresponding operations, and may utilize memory 204 to store collected information. In some instances, the image processing circuitry 210 may further include machine learning circuitry 212 that includes hardware components designed to leverage artificial intelligence to analyze the IR image data and/or compare the IR image data with one or more IR image templates (e.g., a comparison between template IR image data and target IR image data). By way of example, machine learning circuitry 212 may comprise or leverage an artificial neural network or convolutional neural network trained on at least image data of a plurality of captured IR image data associated with gas leaks or plumes. The machine learning circuitry 212 may also utilize processing circuitry, such as the processor 202, to perform its corresponding operations, and may utilize memory 204 to store collected information.

It should also be appreciated that, in some embodiments, the image processing circuitry 210 and/or the machine learning circuitry 212 may include a separate processor, specially configured field programmable gate array (FPGA), or application specific interface circuit (ASIC) to perform its corresponding functions. In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present disclosure may be configured as apparatuses, systems, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example IR Image Operations

FIG. 3 illustrates a flowchart containing a series of operations for example distance determinations. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 305, the apparatus (e.g., computing device 200) includes means, such as processor 202, communications circuitry 208, image processing circuitry 210, or the like, for receiving first infrared (IR) image data from a first IR imaging device 102 associated with a field of view 103 of the first IR imaging device 102. The first IR image data generated by the first IR imaging device 102 may include a plurality of data entries, one or more of which may be associated with particular pixels that represent the FOV 103 of the first IR imaging device 102. For example, the first IR image data may be indicative of the intensity of the IR radiation received by the first IR imaging device 102 for each pixel captured for the FOV 103. As described above, the first IR imaging device 102 may also be associated with a first filter that defines a first band-pass frequency (e.g., a device that passes frequencies within a certain range and attenuates frequencies outside this range). This first filter may be configured to pass IR radiation having a frequency associated with the gas for which the first IR imaging device 102 is design to monitor (e.g., methane or the like) to the first IR imaging device 102.

In embodiments in which the computing device 200 and the first IR imaging device 102 are contained within a common device or integrated device (e.g., the computing device 200 comprises the first IR imaging device 102), the first IR image data may be received by the computing device 200 as part of normal operation of the first IR imaging device 102 (e.g., an internal transmission, if any). In other embodiments in which the computing device 200 is located separate from the first IR imaging device 102, such as connected via network 106, the computing device 200 may be configured to receive the first IR image data from the first IR imaging device 102 in response to generation of the first IR image data. Said differently, each instance of first IR image data generation may be transmitted to the computing device 200 upon generation. In other embodiments, the computing device 200 may periodically (e.g., according to a defined rate) request first IR image data from the first IR imaging device 102.

In some embodiments, the first IR image data may be generated by the first IR imaging device 102 and/or transmitted to the computing device 200 in response to detection of a gas plume 20 within the FOV 103 of the first IR imaging device 102. By way of example, the generation of the first IR image data may be responsive to a change in the IR radiation received by the first IR imaging device 102, such as instances in which a gas plume 20 within the FOV 103 of the first IR imaging device 102 becomes present or becomes absent. Said differently, the first IR imaging device 102 may be configured to generate first IR image data in an instance in which the gas plume 20 is present within the FOV 103. Furthermore, in some embodiments, the first IR imaging device 102 may continuously generate first IR image data, and, in response to a detection of a gas plume 20 or otherwise, the first IR imaging device 102 may transmit a request the first IR image data to the computing device 200.

As shown in operation 310, the apparatus (e.g., computing device 200) includes means, such as processor 202, communications circuitry 208, image processing circuitry 210, or the like, for receiving second infrared (IR) image data from the second IR imaging device 104 associated with a field of view 105 of the second IR imaging device 104. The second IR image data generated by the second IR imaging device 104 may include a plurality of data entries, one or more of which may be associated with particular pixels that represent the FOV 105 of the second IR imaging device 104. For example, the second IR image data may be indicative of the intensity of the IR radiation received by the second IR imaging device 104 for each pixel captured for the FOV 105. As described above, the second IR imaging device 104 may also be associated with a second filter that defines a second band-pass frequency (e.g., a device that passes frequencies within a certain range and attenuates frequencies outside this range). This second filter may be configured to pass IR radiation having a frequency associated with the gas for which the second IR imaging device 104 is design to monitor (e.g., methane or the like) to the second IR imaging device 104.

In embodiments in which the computing device 200 and the second IR imaging device 104 are contained within a common device or integrated device (e.g., the computing device 200 comprises the second IR imaging device 104), the second IR image data may also be received by the computing device 200 as part of normal operation of the second IR imaging device 104 (e.g., an internal transmission, if any). In other embodiments in which the computing device 200 is located separate from the second IR imaging device 104, such as connected via network 106, the computing device 200 may be configured to receive the second IR image data from the second IR imaging device 104 in response to generation of the second IR image data. Said differently, each instance of second IR image data generation may be transmitted to the computing device 200 upon generation. In other embodiments, the computing device 200 may periodically (e.g., according to a defined rate) request second IR image data from the second IR imaging device 104.

In some embodiments, the second IR image data may be generated by the second IR imaging device 104 and/or transmitted to the computing device 200 in response to detection of a gas plume 20 within the FOV 105 of the second IR imaging device 104 and/or detection of a gas plume 20 within the FOV 103 (e.g., in response to detection by the first IR imaging device 102). By way of example, the generation of the second IR image data may be responsive to a change in the IR radiation received by the second IR imaging device 104, such as instances in which a gas plume 20 within the FOV 105 of the second IR imaging device 104 becomes present or becomes absent. Said differently, the second IR imaging device 104 may be configured to generate second IR image data in an instance in which the gas plume 20 is present within the FOV 105. Furthermore, in some embodiments, the second IR imaging device 104 may continuously generate second IR image data, and, in response to a detection of a gas plume 20 or otherwise, the second IR imaging device 104 may transmit a request the second IR image data to the computing device 200.

As shown in operation 315, the apparatus (e.g., computing device 200) includes means, such as processor 202, image processing circuitry 210, machine learning circuitry 212, or the like, for determining, via a template matching procedure, a first feature 118 representing a position of a gas plume 20 based upon the first IR image data and a second feature 120 representing a position of the gas plume 20 based upon the second IR image data As described hereafter with reference to FIG. 4, the computing device 200 may, via a training procedure, calibration procedure, or the like, analyze IR image data from a plurality of different gases so as to determine if the intensity of the IR radiation for this IR image data is indicative of the presence of a gas plume and/or the concentration of the gas in the gas plume. As such, at operation 315, the computing device 200 may, for example, generate template IR image data based upon the first IR image data in which a binary score is applied (e.g., either a zero (0) or a one (1)) to each pixel within the first IR image data. By way of a particular example, if the comparison between a particular pixel within the first IR image data is sufficiently similar to one or more instances of calibrated IR image data (e.g., calibrated data of known gas plume intensities, concentrations, etc.), the computing device 200 may assign a one (1) to that particular pixel of the first IR image data. This process may be iteratively performed for each pixel within the first IR image data in order to determine which pixels within the IR image data are associated with the gas plume 20 so as to generate template IR image data. Following this generation, the computing device 200 generate target IR image data based upon the second IR image data (e.g., data that may be compared against the template IR image data). As described hereafter, the target IR data may comprise a collection of IR image data entries from the second IR image data that may be compared against at least a portion of the template IR image data in order to determine the presence of the gas plume 20 within these pixels of the second IR image data.

Thereafter, the computing device 200 may leverage one or more techniques for determining the geometric center, mass center, corner(s), edge(s), contour(s), etc. of the gas plume 20 based upon the first IR image data (e.g., the first feature 118) and the geometric center, mass center, corner(s), edge (s), contour(s), etc. of the gas plume 20 based upon the second IR image data (e.g., the second feature 120). In some embodiments. The determined first feature 118 and the determined second feature 120 may be coordinates for the respective central positions 118, 120 in two-dimensional space as described above. Again, the present disclosure contemplates that the first feature 118 and the second feature 120 may refer to any location within the gas plume 20 based upon the intended application of the system 100.

Thereafter, as shown in operation 320, the apparatus (e.g., computing device 200) includes means, such as processor 202, image processing circuitry 210, machine learning circuitry 212, or the like, for determining a disparity between the first feature 118 and the second feature 120. As described above, the first feature 118 and the second feature 120 determined at operation 315 may be coordinates in two-dimensional space (e.g., (x, y) coordinates). As such, the disparity at operation 320 may refer to the mathematical difference between the first coordinates for the first feature 118 and the second coordinates for the second feature 120. For example, the Euclidean distance between the coordinates may be used to determine the disparity at operation 320. Given that the housing 108 may constrain the physical position of the first IR imaging device 102 and the second IR imaging device 104, the disparity determination at operation 320 may, in some embodiments, rely upon a single coordinate (e.g., an x coordinate) from the coordinates associated with the first feature 118 and the second feature 120 (e.g., a difference between the x coordinates). As such, the disparity determined at operation 320 may refer to a single value that is the mathematical difference between the x coordinate (e.g., x1 in FIG. 1B) of the first feature 118 and the x coordinate (e.g., x2 in FIG. 1B) of the second feature 120. Although described herein with reference to a disparity determination based upon the x coordinates, the present disclosure contemplates that this disparity determination may similarly be performed for each coordinate in the coordinate pair (e.g., y1 and y2). In some embodiments, the determination of the disparity at operation 320 may be performed as part of operation 325 as described hereafter.

Thereafter, as shown in operation 325, the apparatus (e.g., computing device 200) includes means, such as processor 202, image processing circuitry 210, machine learning circuitry 212, or the like, for determining, via epipolar geometry, a distance 112 between the imaging system 100 and the gas plume 20 based upon the determined disparity. As would be evident in light of the present disclosure, epipolar geometry is the geometry of stereo vision in which two cameras (e.g., first IR imaging device 102 and second IR imaging device 104) capture a two-dimensional scene from distinct positions (e.g., FOV 103 and FOV 105, respectively). The geometric relations between these two-dimensional points (e.g., the coordinates of the first feature 118 and the second feature 120) and their projections in two-dimensional space may be used to determine a distance between the gas plume 20 and the imaging system 100. As shown in the equation below, the disparity may be simplified to the absolute value of the difference between the x coordinates of the first feature 118 and the second feature 120 as described above with reference to operation 320. As above, the present disclosure contemplates that performance of operation 325 may be based upon the absolute value of the difference between any and/or all of the coordinate pairs (e.g., y1 and y2). The distance D (e.g., distance 112) may be determined by this equation where B is the device spacing 110, f is the focal length of the first IR imaging device 102 and the focal length of the second IR imaging device 104, and ps is the pixel size of the first IR imaging device 102 and the pixel size of the second IR imaging device 104. The focal length and/or pixel size for each of the first IR imaging device 102 and/or the second IR imaging device 104 may be known to or otherwise accessible by the computing device 200 (e.g., set parameters of the first IR imaging device 102 and/or the second IR imaging device 104). As such, epipolar geometry, such as via the equation produced below, may be used to determine the distance 112 between the imaging system 100 and the gas plume 20.

$$D = \frac{B * \frac{f}{ps}}{|x_2 - x_1|}$$

In some embodiments, as shown in operation 330, the apparatus (e.g., computing device 200) includes means, such as processor 202, image processing circuitry 210, machine learning circuitry 212, or the like, for modifying one or more operating parameters of the imaging system 100 based upon the determined distance (e.g., distance D or 112 in operation 325). As described above, the embodiments of the present disclosure operate to provide an imaging system that dynamically modifies operation in response to environmental conditions or influences. As such, in some embodiments, the distance determination at operation 325 may, for example, indicate that the imaging system 110 has rotated or otherwise moved such that the ability to accurate capture IR image data of the gas plume 20 is reduced or impeded. As such, the imaging system 100 may, for example, modify an operating parameter of either the first IR imaging device 102 or the second IR imaging device 104 by rotating, tilting, or otherwise moving the first IR imaging device 102 and/or the second IR imaging device 104 in response to the determined distance. Although described herein with modification of a physical position of an element of the imaging system 100, the present disclosure contemplates that the one or more operating parameters may refer to any condition, output, timing, position, etc. of any component of the imaging system 100 based upon the nature of the determined distance.

FIG. 4 illustrates a flowchart containing a series of operations for template threshold comparisons. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 405, the apparatus (e.g., computing device 200) includes means, such as processor 202, communications circuitry 208, image processing circuitry 210, or the like, for generating template IR image data based upon the first IR image data. As described above, the computing device 200 may, for example, apply a binary score (e.g., either a zero (0) or a one (1)) to each pixel (e.g., each first IR image data entry) within the first IR image data so as to generate template IR image data against which IR image from the second IR image device may be compared as described hereafter. By way of continued example, if the comparison between a particular pixel within the first IR image data is sufficiently similar to one or more calibrated IR image data entries (e.g., calibrated values of known gas plume intensities, concentrations, etc.), the computing device 200 may assign a one (1) to that particular pixel. This process may be iteratively performed for each pixel within the first IR image data in order to determine the pixels within the first IR image data are associated with the gas plume 20 and to generate template IR image data. Although described herein with reference to a binary value assignment procedure, the present disclosure contemplates that the computing device 200 may leverage any mechanism, machine learning model, artificial intelligence technique, or the like to generate template IR image data based upon the first IR image data.

As shown in operation 410, the apparatus (e.g., computing device 200) includes means, such as processor 202, communications circuitry 208, image processing circuitry 210, or the like, for generating target IR image data based upon the second IR image data. As described above with reference to operation 315, the computing device 200 may, generate target IR image data based upon the second IR image data (e.g., data that may be compared against the template IR image data generate at operation 405). As described herein, the target IR data may comprise a collection of IR image data entries from the second IR image data that may be compared against at least a portion of the template IR image data in order to determine the presence of the gas plume 20 within these pixels of the second IR image data (e.g., generate a similarity score). Although described herein as a collection of second IR image data entries, the present disclosure again contemplates that the computing device 200 may leverage any mechanism, machine learning model, artificial intelligence technique, or the like to select second IR image data entries for generating target IR image data. Although described herein with reference to use of the first IR image data in generating the template IR image data at operation 405 and use of the second IR image data in generating the target IR image data at operation 410, the present disclosure contemplates that, in some embodiments, the second IR image data may be used to generate the template IR image data and the first IR image data may be used to generate the target IR image data.

Thereafter, as shown in operations 415, 420 the apparatus (e.g., computing device 200) includes means, such as processor 202, communications circuitry 208, image processing circuitry 210, or the like, for generating a similarity score based upon a comparison between the template IR image data and the target IR image data and comparing the similarity score with a template threshold. By way of continued example, the first IR image device 102 and the second IR image device 104 may iteratively generate first and second IR image data, respectively, that may or may not include pixels associated with gas plumes or other gas leakages within their respective FOVs 103, 105. As such, the template threshold comparisons at operations 415, 420 may operate to prevent unnecessary processing in instances in which the IR image data of either the first IR imaging device 102 or the second IR imaging device 104 fails to include sufficient pixels associated with detection of a gas plume 20. As such, the comparison at operation 415 may refer to a comparison between the template IR image data and the target IR image data to determine a similarity score. The similarity score may refer to a pixel-by-pixel (e.g., data entry by data entry) comparison between the binary values assigned to each of the pixels within the first IR image data and the corresponding pixels within the target IR image data generated based upon the second IR image data. This similarity score may, in some embodiments provide a mathematical value indicative of the similarity between the template IR image data and the target IR image data.

Thereafter, as shown in operation 420, the similarity score may be compared with a template threshold to determine if the similarity score satisfies or exceeds a minimum value (e.g., a minimum number of pixels assigned a one (1)). By way of a nonlimiting example, the template threshold may define a value of 50% in that at least 50% of the pixels in the target IR image data substantially match the corresponding pixels in the template IR image data. In an instance in which the similarity satisfies the template threshold, as shown in operation 425, the apparatus (e.g., computing device 200) includes means, such as processor 202, communications circuitry 208, image processing circuitry 210, or the like, for determining the first feature 118 and the second feature 120 as described above with reference to FIG. 3.

In an instance in which the similarity score fails to satisfy the template threshold, as shown in operation 430, the apparatus (e.g., computing device 200) includes means, such as processor 202, communications circuitry 208, image processing circuitry 210, or the like, for generating an alert signal. By way of example, in some embodiments the alert signal may cause the computing device 200 to generate a user notification for presenting to a user associated with the imaging system 100. For example, a display communicably coupled with the computing device 200 may receive a user notification and/or an alert signal comprising instructions to display the user notification and may subsequently display this notification to the user for review. In other embodiments, the alert signal may be configured to set the distance between the imaging system 100 and the gas plume 20 as a default distance. By way of example, in some instances the first IR image data and/or the second IR image data may fail to include sufficient IR image data associated with the gas plume 20 to allow for determination of the distance 112 between the imaging system 100 and the gas plume 20. In such an embodiment, the computing device 200 may set the distance as a default distance, such as the distance determine by an initial calibration procedure, the limit of the imaging system's resolution, and/or the like until further iterations provide sufficient IR image data to perform the operations of FIG. 3.

FIGS. 3-4 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200.

As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

The invention claimed is:

1. An imaging system comprising:
a plurality of infrared (IR) imaging devices configured to generate a plurality of IR image data of a field of view of the plurality of IR imaging devices;
a computing device operably connected with the plurality of IR imaging devices, wherein the computing device is configured to:
receive the plurality of IR image data;
determine, via a template matching procedure, a plurality of features representing a position of a gas plume based upon the plurality of IR image data;
determine a disparity between the plurality of features; and
determine, via epipolar geometry, a distance between the imaging system and the gas plume based upon the determined disparity.

2. The imaging system according to claim 1, wherein each of the plurality of IR imaging devices is supported by a housing such that a device spacing is defined between each of plurality of IR imaging devices.

3. The imaging system according to claim 2, wherein each of the plurality of IR imaging devices is associated with the same focal length and pixel size.

4. The imaging system according to claim 3, wherein the computing device is configured to determine the distance between the imaging system and the gas plume based upon the determined disparity, the device spacing, the focal length, and the pixel size.

5. The imaging system according to claim 1, further comprising a filter attached to each of the plurality of IR imaging devices, wherein the filter defines a band-pass frequency associated with a frequency of the gas plume.

6. The imaging system according to claim 1, wherein the computing device, prior to determining the plurality of features of the gas plume, is further configured to:
  generate template IR image data based upon at least part of the plurality of IR image data;
  generate target IR image data based upon another part of the plurality of IR image data;
  generate a similarity score based upon a comparison between the template IR image data and the target IR image data;
  compare the similarity score with a template threshold;
  in an instance in which the similarity score satisfies the template threshold, determine the plurality of features; and
  in an instance in which the similarity score fails to satisfy the template threshold, generate an alert signal.

7. The imaging system according to claim 6, wherein generating the template IR image data comprises assigning a binary value to one or more data entries of the at least part of the plurality of IR image data.

8. The imaging system according to claim 6, wherein the alert signal is configured to present a notification to a user associated with the imaging system.

9. The imaging system according to claim 6, wherein the alert signal is configured to set the distance between the imaging system and the gas plume as a default distance.

10. The imaging system according to claim 1, wherein the computing device is further configured to modify one or more operating parameters of the imaging system based upon the determined distance.

11. A computer-implemented method comprising:
  receiving a plurality of infrared (IR) image data from a plurality of IR imaging devices of an imaging system associated with a field of view of the plurality of IR imaging devices;
  determining, via a template matching procedure, a plurality of features representing a position of a gas plume based upon the plurality of IR image data;
  determining a disparity between the plurality of features; and
  determining, via epipolar geometry, a distance between the imaging system and the gas plume based upon the determined disparity.

12. The computer-implemented method according to claim 11, wherein each of the plurality of IR imaging devices is supported by a housing such that a device spacing is defined between each of plurality of IR imaging devices.

13. The computer-implemented method according to claim 12, wherein each of the plurality of IR imaging devices is associated with the same focal length and pixel size.

14. The computer-implemented method according to claim 13, wherein determining the distance between the imaging system and the gas plume is based upon the determined disparity, the device spacing, the focal length, and the pixel size.

15. The computer-implemented method according to claim 11, wherein, prior to determining the plurality of features of the gas plume, the computer-implemented method further comprises:
  generating template IR image data based upon at least part of the plurality of IR image data;
  generating target IR image data based upon another part of the plurality of IR image data;
  generating a similarity score based upon a comparison between the template IR image data and the target IR image data;
  comparing the similarity score with a template threshold;
  in an instance in which the similarity score satisfies the template threshold, determining the plurality of features; and
  in an instance in which the similarity score fails to satisfy the template threshold, generating an alert signal.

16. The computer-implemented method according to claim 15, wherein generating the template IR image data comprises assigning a binary value to one or more data entries of the at least part of the plurality of IR image data.

17. The computer-implemented method according to claim 15, wherein the alert signal is configured to present a notification to a user associated with the imaging system.

18. The computer-implemented method according to claim 15, wherein the alert signal is configured to set the distance between the imaging system and the gas plume as a default distance.

19. The computer-implemented method according to claim 11, further comprising modifying one or more operating parameters of the imaging system based upon the determined distance.

20. A computer program product comprising at least one non-transitory computer-readable storage medium having non-transitory computer program code thereon that, in execution with at least one processor, configures the computer program product for:
  receiving a plurality of infrared (IR) image data from a plurality of IR imaging devices of an imaging system associated with a field of view of the plurality of IR imaging devices;
  determining, via a template matching procedure, a plurality of features representing a position of a gas plume based upon the plurality of IR image data;
  determining a disparity between the plurality of features; and
  determining, via epipolar geometry, a distance between the imaging system and the gas plume based upon the determined disparity.

* * * * *